United States Patent [19]
Mumm

[11] 4,013,145
[45] Mar. 22, 1977

[54] VEHICLE HILL HOLDER

[75] Inventor: Frank D. Mumm, Rancho Cordova, Calif.

[73] Assignee: Lawrence Peska Associates, Inc., New York, N.Y.

[22] Filed: Jan. 7, 1976

[21] Appl. No.: 647,082

[52] U.S. Cl. .............................................. 188/32
[51] Int. Cl.² ........................................ B60T 3/00
[58] Field of Search .............................. 188/32, 36

[56] References Cited

UNITED STATES PATENTS

| | | | |
|---|---|---|---|
| 866,474 | 9/1907 | Keeran | 188/32 UX |
| 1,407,338 | 2/1922 | Skiles | 188/32 |
| 2,581,619 | 1/1952 | Arrigo | 188/32 |
| 2,870,872 | 1/1959 | Rapp | 188/32 |

FOREIGN PATENTS OR APPLICATIONS

| | | | |
|---|---|---|---|
| 64,771 | 10/1892 | Germany | 188/32 |
| 418,144 | 9/1925 | Germany | 188/32 |

Primary Examiner—Duane A. Reger

[57] ABSTRACT

A vehicle hill holder such as a wheel chock is disclosed comprising a pair of blocks which have opposable ends, one block having a pair of springs pivotally secured to opposite sides thereof that swing in a direction towards the second block. The free ends of the springs are removable insertable into a lever mounted on the second block, the fulcrum of the lever being in a plane above the base of the blocks and above the end of the first block where the springs are pivotally secured. The lever is depressed in an arc towards the base of the second block and thereby stretches the spring forcing the blocks towards one another to secure a wheel positioned between the blocks. The chocks are separated by raising the lever to release spring tension followed by removing the springs from the lever after which the blocks may be pulled apart from one another.

4 Claims, 2 Drawing Figures

U.S. Patent  Mar. 22, 1977  4,013,145
FIG.1
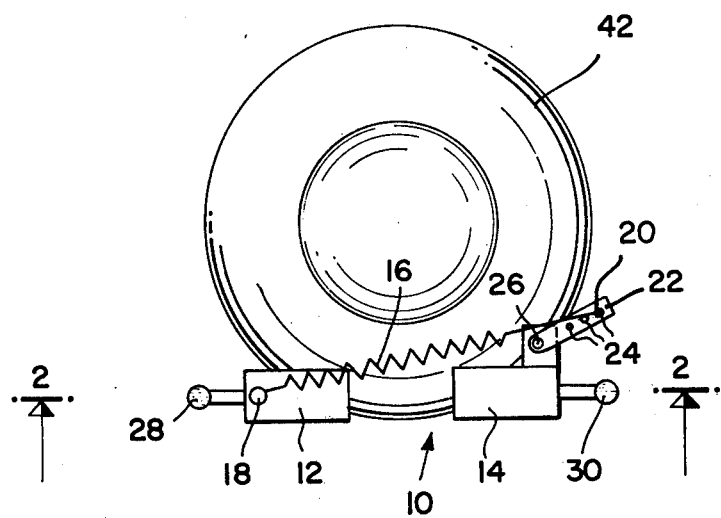
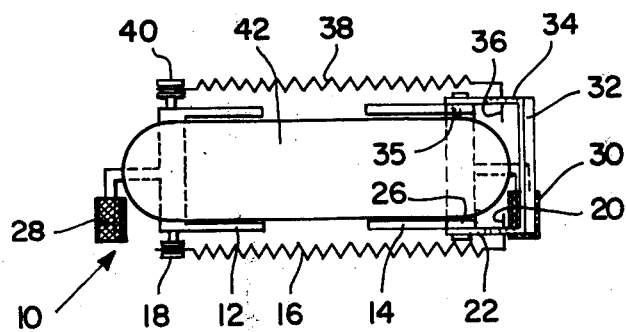
FIG.2

VEHICLE HILL HOLDER

DETAILED DESCRIPTION

The present invention relates to a wheel chock comprising a first block member and a second block member opposable to one another, a first resilient member pivotally secured to one side of the first block to swing in the direction of the second block and a second resilient member pivotally secured to the side of the first block opposite the first resilient member to swing in the direction of the second block. A lever pivotally mounted on a fulcrum is provided whereby the fulcrum is secured to the second block, the lever being movable towards the base of the second block to increase the tension on the first and second resilient members when the resilient members are attached to the lever. The free ends of the resilient members are detachably securable to the lever so that the block assembly may be taken apart for removal from a wheel positioned between the blocks and for placing the blocks against a wheel to hold a wheel in place.

In a further embodiment, the resilient members are secured to the first block through pivot means, so that the pivot lies in a pivot plane above the base of the blocks and the fulcrum lies in a fulcrum plane above the pivot plane so that when the lever is depressed downwardly towards the base of the second block, it swings in an arc below the fulcrum and is biased by the resilient members in a downward direction towards the base of the second block. This downward biasing action serves to lock the lever in place in a downward direction so that the lever is actually pulled downwardly onto a road surface on which the wheel being chocked rests.

In a further embodiment, means are provided on the lever for adjusting the tension on the resilient members and comprises means for securing the resilient members at various positions along the length of the lever such as pins extending from the resilient member which are removably inserted in pin receiving openings along the length of the lever.

DETAILED DESCRIPTION OF THE SEVERAL VIEWS OF THE DRAWING

FIG. 1 comprises a side elevation illustrating a wheel chock having resilient members and a lever for pulling the wheel chocks towards one another and biasing the wheel chocks towards one another through a resilient member according to one embodiment of the present invention.

FIG. 2 comprises a plan view taken along the line 2—2 of FIG. 1.

DETAILED DESCRIPTION

Vehicle wheel chock assemblies are known in the prior art as disclosed for example in U.S. Pat. Nos. 3,845,844 Woerner; 3,547,228 Wiley; 3,317,006 Patterson; 3,024,871 Stein; 2,858,906 Minick; 2,773,564 Garard, Sr.; 2,581,619 Arrigo; 2,491,989 Lind; and, 2,475,111 Ridland. The Patents to Minick and Arrigo disclose wheel chock assemblies having resilient members for urging the wheel chocks against vehicle wheels; however, these resilient members or springs are only provided on one side of the chock assembly and as a result the assembly tends to be unevenly biased into the base of a vehicle wheel when in use. Additionally, in order to be effectively biased into a vehicle wheel, the chock assembly must have heavy duty springs or resilient members for resiliently urging the chock assembly into the base of a wheel, resilient members of this type being difficult to manipulate. Neither the Arrigo nor the Minick reference provide means for the easy manipulation of a heavy duty resilient member for urging a wheel chock against a wheel.

It is therefore an object of the present invention to overcome these and other difficulties encountered in the prior art.

It is a further object of the present invention to provide a vehicle wheel chock assembly which is resiliently biased into engagement with a wheel on both sides of the assembly.

It is a further object of the present invention to provide a vehicle wheel chock assembly which is easily manipulated into a biasing relationship or engagement with a wheel.

These and other objects have been achieved by the present invention and will become apparent by reference to the disclosure and claims that follow as well as the appended drawing.

Referring to the drawing and FIGS. 1 and 2, a wheel chock assembly 10 is illustrated comprising a first block being opposed to one another, first block 12 having a resilient member such as a coil spring 16 pivotally secured at one end thereof through pivot 18 extending from block 12, the other end of resilient member 16 terminating in a pin 20 which may be adjustably secured to lever arm 22 through openings 24 for adjustment of the tension on resilient member 16.

Arm 22 is pivotally secured to a fulcrum 26 mounted on top of block 14. Lever arm 22 extends in a handle member 32 across the width of block 14 and is in turn secured to a second lever arm 34 having a plurality of openings along the length thereof (not illustrated) corresponding to the openings 24 in lever arm 22 for releasably and adjustably engaging pin 36 extending from one end of resilient lever arm 34 is pivotally secured to fulcrum 35 mounted on top of block 14 member 38 such as coil spring 38. The other end of resilient member 38 is pivotally secured to block 12 through pivot 40. Handle member 28 is provided on block 12 whereas handle member 30 is provided on block 14 for positioning the blocks 12 and 14 with respect to a vehicle wheel.

The pivot members 18 and 40 to which resilient means 16 and 38 respectively are secured lie in a plane below the plane in which a fulcrum comprising members 26 and 35 lie, the plane in which pivot 18 and 40 are positioned being above the base of blocks 12 and 14.

In use, pins 20 and 36 are removed from the openings 24 on handle 22 and the corresponding openings in handle 34 and the block assemblies 12 and 14 are separated from one another. Block 12 is then positioned underneath the front edge of a vehicle wheel 42 and the resilient members 16 and 38 extended towards the opposite edge of wheel 42. Handle 28 provides for the easy manipulation of the block 12 into engagement with the front edge of wheel 42. Block 14 is then positioned by means of handle 30 that the opposable faces of block 12 and 14 are facing one another. Handle 32 is then moved in a direction towards wheel 42 until it is folded upwardly towards block 12 after which the pins 36 and 20 are inserted in the openings 24 on lever arm 22 and the counterpart openings in lever arm 34. The block assemblies are then brought towards one another by swinging handle 32 and lever arms 22 and 34 in an arc downward towards the base of block assemblies 12 and 14. The movement of lever arms 22, 34 and handle 32 downwardly applies tension to resilient members 16 and 38 that cause blocks 12 and 14 to move towards one another and into firm engagement with the front and back edges of wheel 42. As handle 32 is swung downwardly below the plane in which the fulcrum 26 and 35 lie, resilient members 16 and 38 resiliently bias the lever 22 and 34 and handle 32 downwardly towards block 14 and into contact with the surface on which wheel 42 is resting, thereby locking the lever arms 22 and 34 and handle 32 in a downward position. In order to release the chock, the handle 32 is swung upwardly moving lever arms 22 and 34 in an upward direction and also towards block assembly 12 thereby relieving tension on the resilient members 16 and 38 sufficiently to allow the blocks to be separated and the pins 20 and 36 removed from the lever arms 22 and 34.

Although the invention has been described by reference to some embodiments it is not intended that the novel chock assembly to limited thereby but that modifications thereof are intended to be included as falling within the broad scope and spirit of the foregoing disclosure, the following claims and the appended drawing.

What is claimed is:

1. A wheel chock comprising first block means and second block means opposable to one another, first resilient means pivotally secured to one side of said first block to swing in the direction of said second block and second resilient means pivotally secured to the side of said first block opposite said first resilient means to swing in the direction of said second block, lever means pivotally mounted on fulcrum means secured to said second block, said lever being movable toward the base of said second block to increase the tension on said first and second resilient means when said first and second resilient means are attached to said lever, means for detachably securing said first and second resilient means to said lever said resilient means being pivotally secured to said blocks through pivot means, said pivot means lying in a pivot plane above the base of said blocks, and said fulcrum lies in a fulcrum plane above said pivot so that when said lever is depressed downwardly in an arc below said fulcrum, said lever is biased by said resilient means in a downward direction toward the base of said second block.

2. The wheel chock of claim 1 comprising means on said lever for adjusting the tension on said resilient means.

3. The wheel chock of claim 2 where said means for adjusting tension on said resilient means comprise adjustment means for releasably securing said resilient means at various positions along the length of said lever.

4. The wheel chock of claim 3 where said adjusting means comprise pins extending from the free ends of said resilient means for insertion into a plurality of pin receiving openings along the length of said lever.

* * * * *